(12) United States Patent
Kimelman et al.

(10) Patent No.: US 7,444,546 B2
(45) Date of Patent: Oct. 28, 2008

(54) ON-BOARD DIAGNOSTIC CIRCUIT FOR AN INTEGRATED CIRCUIT

(75) Inventors: Paul Kimelman, Alamo, CA (US); Ian Field, Walnut Creek, CA (US)

(73) Assignee: ARM Limited, Cambridge (GB)

( * ) Notice: Subject to any disclaimer, the term of this patent is extended or adjusted under 35 U.S.C. 154(b) by 835 days.

(21) Appl. No.: 10/417,335

(22) Filed: Apr. 17, 2003

(65) Prior Publication Data

US 2004/0210797 A1 Oct. 21, 2004

(51) Int. Cl.
*G60F 11/00* (2006.01)

(52) U.S. Cl. .............................. 714/31; 714/27; 714/30

(58) Field of Classification Search ................... 714/27, 714/31, 30
See application file for complete search history.

(56) References Cited

U.S. PATENT DOCUMENTS

| | | | | | |
|---|---|---|---|---|---|
| 4,183,459 | A | * | 1/1980 | Donn et al. | 714/49 |
| 5,468,992 | A | * | 11/1995 | Kanekawa et al. | 257/676 |
| 5,525,971 | A | | 6/1996 | Flynn | |
| 5,664,124 | A | * | 9/1997 | Katz et al. | 710/315 |
| 6,065,078 | A | * | 5/2000 | Falik et al. | 710/100 |
| 6,115,763 | A | * | 9/2000 | Douskey et al. | 710/72 |
| 6,142,683 | A | * | 11/2000 | Madduri | 717/128 |
| 6,208,924 | B1 | * | 3/2001 | Bauer | 701/45 |
| 6,430,727 | B1 | * | 8/2002 | Warren | 716/4 |
| 6,779,145 | B1 | * | 8/2004 | Edwards et al. | 714/733 |
| 6,918,058 | B2 | * | 7/2005 | Miura et al. | 714/30 |
| 6,948,098 | B2 | * | 9/2005 | Pillay et al. | 714/34 |
| 7,080,283 | B1 | * | 7/2006 | Songer et al. | 714/30 |
| 2003/0172214 | A1 | * | 9/2003 | Moyer et al. | 710/200 |
| 2004/0030958 | A1 | * | 2/2004 | Moerman | 714/30 |
| 2004/0082297 | A1 | * | 4/2004 | Stambaugh et al. | 455/67.11 |
| 2004/0139247 | A1 | * | 7/2004 | Mahowald et al. | 710/38 |

FOREIGN PATENT DOCUMENTS

| | | |
|---|---|---|
| EP | 1 168 181 | 1/2002 |
| GB | 2 338 791 | 12/1999 |
| GB | 2 368 669 | 5/2002 |
| JP | 1-134639 | 5/1989 |
| JP | 10-242965 | 9/1998 |
| JP | 2000-82020 | 3/2000 |

(Continued)

OTHER PUBLICATIONS

Digital Print & Imaging Association Glossary http://www.dpia.org/glossary/f.html Aug. 29, 2000 version found via the Way Back Machine.*

(Continued)

*Primary Examiner*—Scott T. Baderman
*Assistant Examiner*—Joseph Schell
(74) *Attorney, Agent, or Firm*—Nixon & Vanderhye P.C.

(57) ABSTRACT

An integrated circuit having a plurality of functional circuits interconnected via a functional bus is provided with a diagnostic bus-master circuit which uses bus transactions on the functional bus to perform diagnostic operations. These diagnostic operations can be performed in real time during normal speed operation of the integrated circuit to produce more accurate diagnostic results. The diagnostic bus-master circuit is particularly useful for reading data values from memory or writing data values to memory as part of diagnostic operations.

26 Claims, 6 Drawing Sheets

FOREIGN PATENT DOCUMENTS

| | | |
|---|---|---|
| JP | 2001-331442 | 11/2001 |
| JP | 2002-14838 | 1/2002 |
| JP | 2002-149498 | 5/2002 |
| JP | 2002-149627 | 5/2002 |

OTHER PUBLICATIONS

AMBA Specification Revision 2.0 ARM Limited, 1999.*

IEEE Standard Test Access Port and Boundary-Scan Architecture Published Jul. 23, 2001 by IEEE ISBN 0-7381-2945-3.*

WhaterWheel.com article "Motherboard External Bus" http://www.waterwheel.com/Guides/motherboards/motherboard_external_bus.htm retrieved May 24, 2007.*

Siliconfareast.com article "System on a Chip (SOC)" http://www.siliconfareast.com/soc.htm retrieved May 24, 2007.*

ComputerHope.com glossary article "Bus" http://www.computerhope.com/jargon/b/bus.htm retrieved May 24, 2007.*

\* cited by examiner

ON-BOARD DIAGNOSTIC CIRCUIT FOR AN INTEGRATED CIRCUIT

BACKGROUND OF THE INVENTION

1. Field of the Invention

This invention relates to the field of integrated circuits. More particularly, this invention relates to on-board diagnostic circuits for integrated circuits.

2. Description of the Prior Art

It is known to provide on-board diagnostic circuits for integrated circuits. One example of such known circuits are the serial scan chains controlled by a JTAG-type controller as used by ARM Limited of Cambridge, England in several of its microprocessor designs. A problem with known scan chain type diagnostic circuits is that the serial scanning in and scanning out of data is insufficiently quick to allow real time and/or efficient diagnostic operations. In particular, it may be necessary to slow an integrated circuit below its normal operating speed, or halt it, so that the serial diagnostic data may be scanned in and scanned out of the serial scan chains. Operating an integrated circuit below its normal operating speed has the result that the diagnostic operation performed is not truly representative of real functional operation of the integrated circuit. It may be that certain faults only manifest themselves at the full operating speed and will be invisible at the lower speeds at which the circuit must operate to accommodate the use of diagnostic serial scan chains. Further using the JTAG as communications to the processor for debug creates at least a two-step approach to the access of system resources.

SUMMARY OF THE INVENTION

Viewed from one aspect the present invention provides an integrated circuit comprising:

a plurality of functional circuits operable to perform data processing operations;

at least one functional bus operable to provide communication between said plurality of functional circuits; and a diagnostic bus-master circuit operable to perform a diagnostic operation upon at least one of said plurality of functional circuits by issuing a bus transaction request via said at least one functional bus to one or more of said plurality of functional circuits during real time operation of said plurality of functional circuits.

The invention provides a diagnostic bus-master circuit coupled to the functional bus of the integrated circuit. This diagnostic bus-master circuit can be used to issue bus transactions onto the functional bus in order to perform diagnostic operations. These bus transactions may serve to stimulate a functional circuit with certain data, capture data from a functional circuit or a combination of these or other actions. The technique exploits the existing provision of a bus structure between functional circuits to provide an insertion point for diagnostic signal stimulus and capture which is able to operate in real time since there is no need to clock data around a serial scan chain to load values into latches dispersed throughout the circuit. Whilst it might be thought that diagnostic access via the functional bus would be limited in utility, in practice a large proportion of the type of diagnostic testing which it is desired to perform within modem system-on-chip type integrated circuits revolves around checking the proper communication between the various functional circuits via standard buses, such as the AMBA or AHB buses. It is often the case that the different functional circuits will already have been separately tested and validated as stand-alone items and what is significant in the design of the new integrated circuit is the interconnection of those items and their proper communication via the functional bus. The present technique is well suited to providing such diagnostic type operation rapidly, relatively non-intrusively and with reduced overhead.

The diagnostic bus-master circuit can perform diagnostic operations in the form of debugging or manufacturing test type operations. Additionally, the diagnostic bus-master circuit can also be used to perform manufacturing programming, manufacturing configuration, field programming and field configuration type operations. This enables the diagnostic bus-master circuit to be re-used to beneficial effect outside of the pure diagnostic field thereby advantageously amortising its associated overhead.

In preferred embodiments of the invention the diagnostic bus-master circuit may be arranged to perform an authentication operation to authorise itself prior to it performing diagnostic operations. This feature is strongly advantageous in secure systems in which diagnostic features may be inappropriately used to gain access to secure data, such as secret encryption keys and the like. By ensuring that the diagnostic bus-master circuit must authenticate itself prior to use, inappropriate use of this mechanism can be restricted. In particular, the authentication can take the form of requiring the diagnostic bus-master circuit to issue an authentication request matching predetermined criteria, such as including a secret key (provided by an external source), that are required before the diagnostic bus-master circuit is able to access functional circuit elements.

In addition to providing access to the functional bus, preferred embodiments of the invention include a dedicated diagnostic bus via which the diagnostic bus-master circuit can gain access to data not normally accessible via the functional bus. Thus, the dedicated diagnostic bus can be arranged to access state within functional circuits that is not normally accessible via the functional bus as it is not normally required to be transferred between functional circuits during normal operation. This feature is particularly useful when combined with the authentication techniques discussed above whereby access to this dedicated diagnostic bus can be restricted to authenticated operation. Further, the isolation of such a bus avoids malicious and accidental use of these additional data values/registers.

It will be appreciated that in some integrated circuits multiple functional buses are utilised which may have different bus protocols. Preferred embodiments cater for this by providing the diagnostic bus-master circuit with a plurality of bus interface circuits responsible for communicating with respective functional buses using their particular bus protocols. A selection mechanism allows choosing which bus to access.

The diagnostic bus-master circuit communicates with an external diagnostic device, such as, for example, a computer with an appropriate interface card, using an external signal protocol. In order to facilitate such communication, the diagnostic bus-master circuit includes an external interface circuit for providing this communication link and adapting between communication protocols as required.

In preferred embodiments of the invention the diagnostic bus-master circuit is also operable to transfer signals between clock domains in a manner that effectively de-couples the external diagnostic environment from the integrated circuit clocked environment.

The diagnostic bus-master circuit is particularly well suited to the manipulation of data values stored within devices coupled to the functional bus, such as data values stored within memories, peripherals or other devices. These data values can be loaded, stored, copied and verified using the diagnostic bus-master circuit.

A particularly useful example of such type of use is when the integrated circuit includes a flash memory coupled to the bus and the diagnostic bus-master circuit is used to program that flash memory using a flash memory programming protocol. Programming such a flash memory is typically a run time operation and may not be efficiently and effectively possible using the general purpose functional circuits of the integrated circuit.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
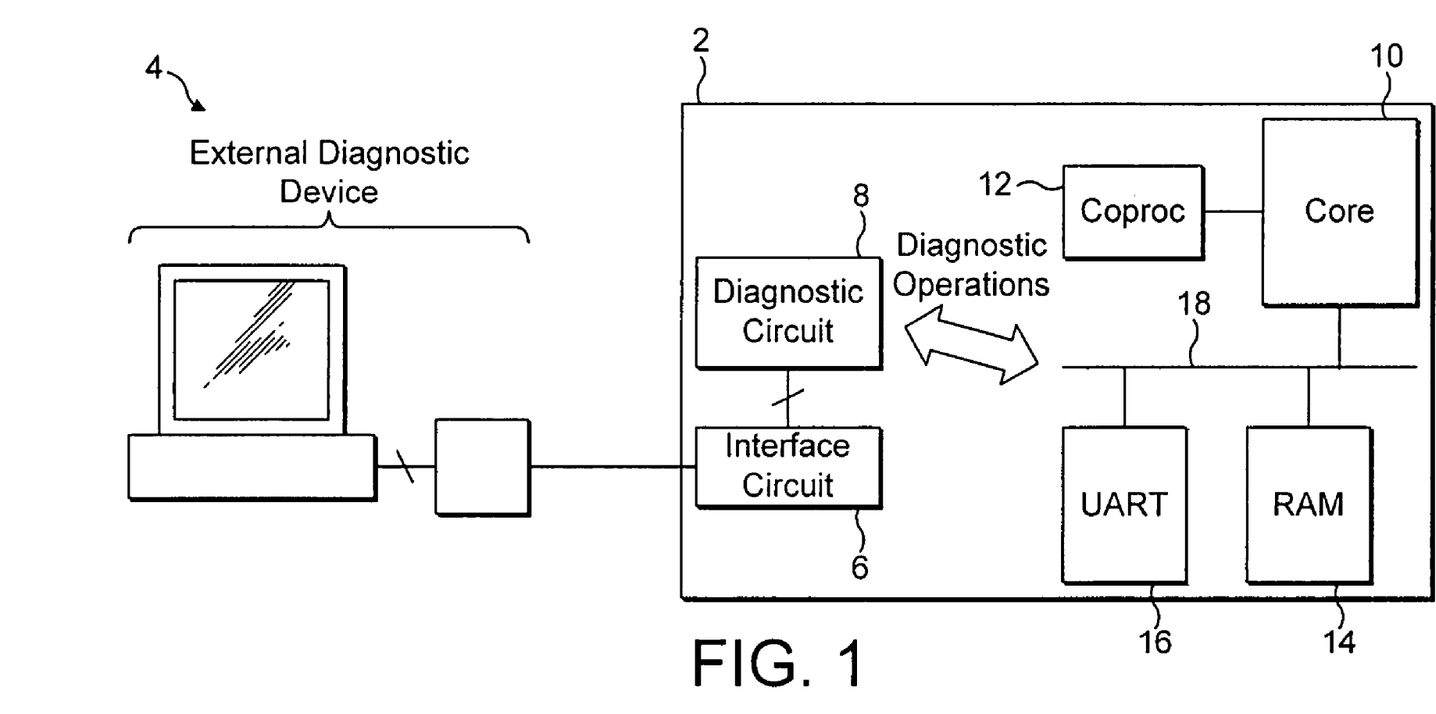
FIG. 1 schematically illustrates an integrated circuit including on-board diagnostic systems connected to an external diagnostic device.

FIG. 1 illustrates an integrated circuit 2 connected to an external diagnostic device 4. The connection between the external diagnostic device 4 and integrated circuit 2 is via a bi-directional serial interface, such as JTAG or SWJ. Within the integrated circuit 2, an interface circuit 6 receives the bi-directional signal(s). The data decoded from that serial signal and control signals decoded from that serial signal are passed to a diagnostic circuit 8 which performs diagnostic operations on the other elements of the integrated circuit 2 in dependence upon those control signals and data. Data and control signals may also be passed back from the integrated circuit 2 to the external diagnostic device 4 via the bi-directional serial signal. The integrated circuit 2 will typically be a system-on-chip (SoC) integrated circuit.

The functional circuits within the integrated circuit 2 include a processor core 10, a coprocessor 12, a memory 14 and a serial UART device 16. These functional circuits are connected by a functional bus 18 (e.g. an AMBA, AHB or other bus for connecting functional circuits. The diagnostic circuit 8 is schematically illustrated as a block within the integrated circuit 2. It will be appreciated that this diagnostic circuit could take a variety of different forms and may, for example, include serial scan chains extending around the periphery of the integrated circuit 2, certain functional elements or within certain functional elements as required. The diagnostic circuitry 8 may also have other forms such as a BIST device and the like.

In use, an engineer using the external diagnostic device will command certain diagnostic operations to be performed on the integrated circuit 2 in response to control signals and data passed to the integrated circuit 2 along the bi-directional serial interface and via the interface circuit 6. Result data will be passed back through the interface circuit 6 along the bi-directional interface to the external diagnostic device 4.

Figure 2:
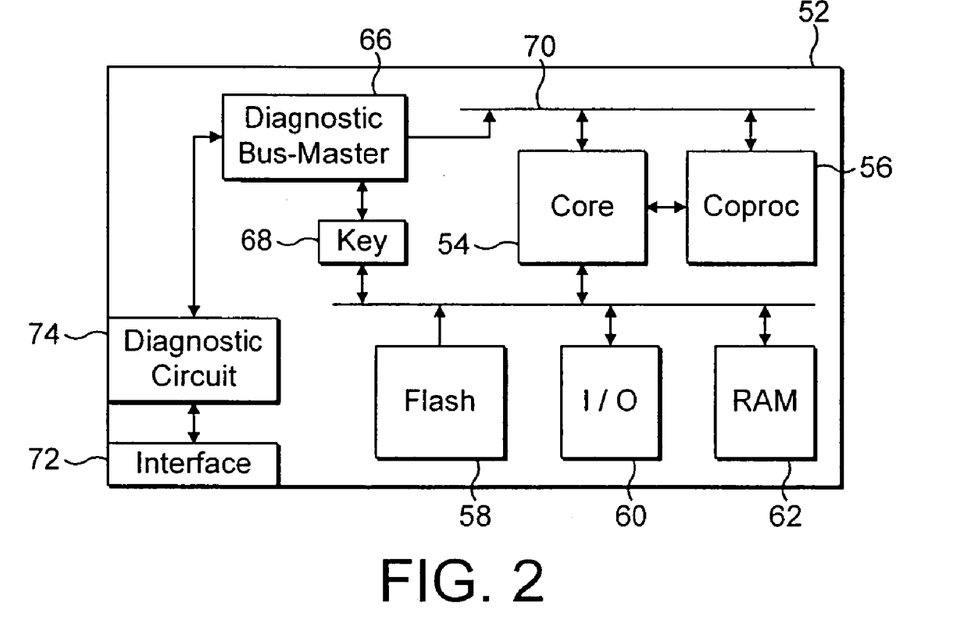
FIG. 2 is a diagram schematically illustrating an integrated circuit incorporating a diagnostic bus-master circuit for issuing bus transactions to carry out diagnostic operations upon an integrated circuit.
Figure 3:
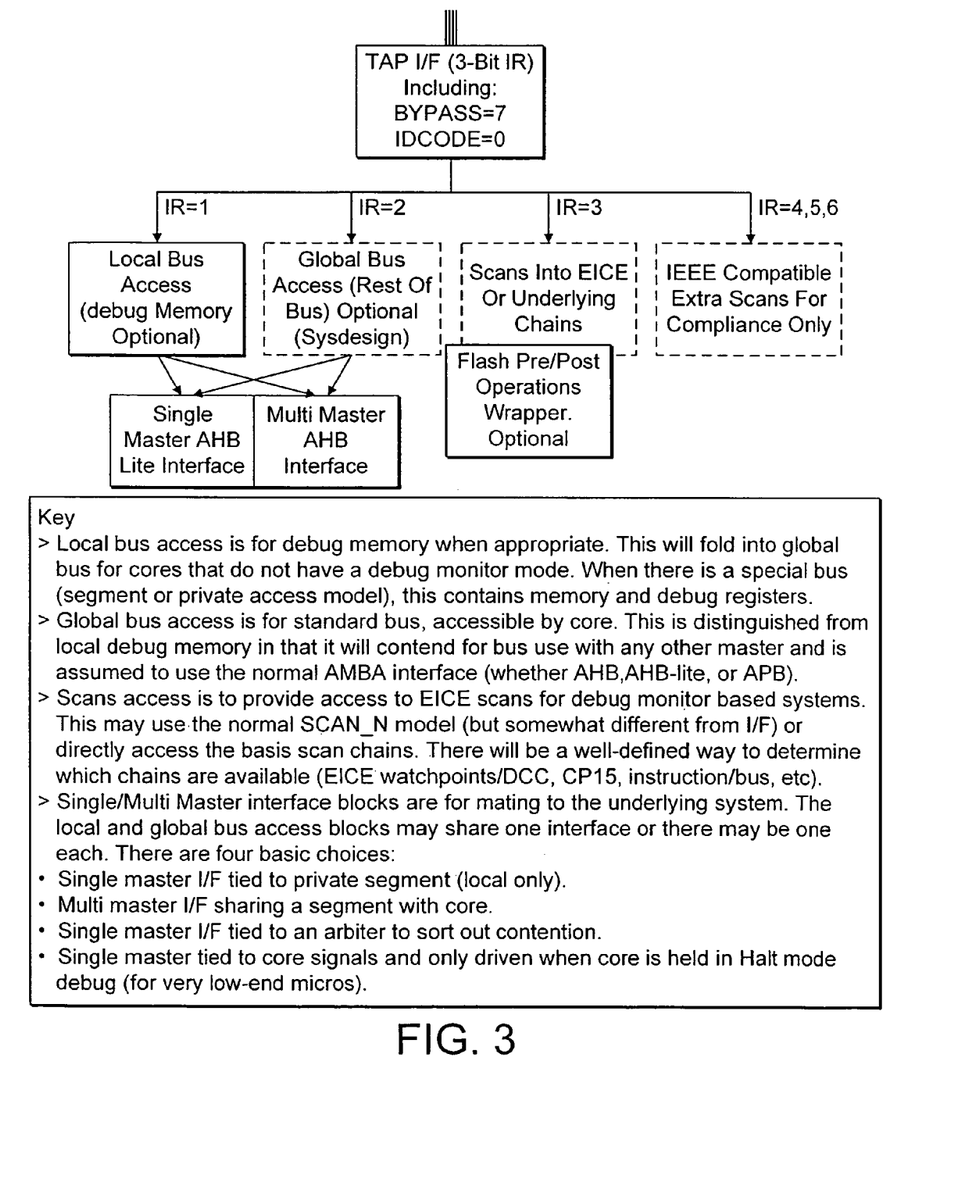
FIGS. 3 to 5 illustrate aspects of a diagnostic bus-master circuit technique.
Figure 4:
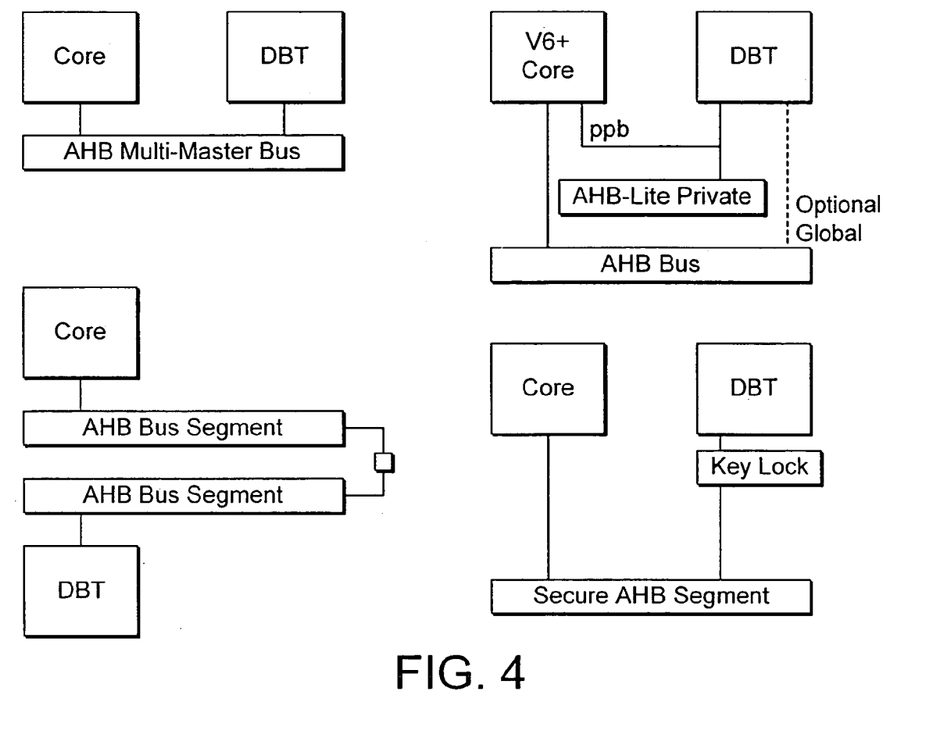
Figure 5:
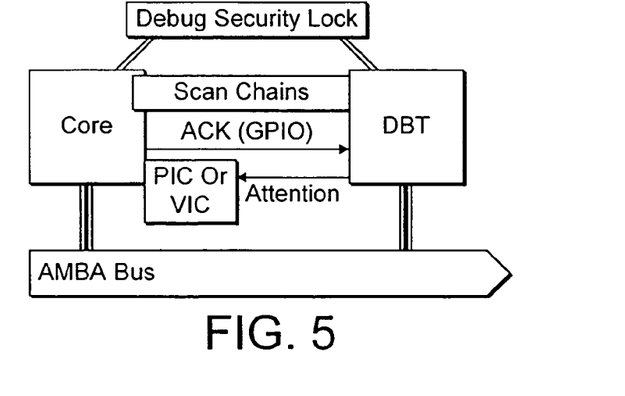

FIG. 2 schematically illustrates an integrated circuit 52 (e.g. a SoC integrated circuit) incorporating a plurality of functional circuits including a processor core 54, a coprocessor 56, a flash memory 58, an input/output circuit 60 and a memory 62. The processor core 54, the flash memory 58, the input/output circuit 60 and the memory 62 are connected via a common functional bus 64, which may, for example, be an ARM AMBA AHB bus or other system bus. This common functional bus 64 has an associated bus protocol and is used in the normal master/slave type arrangement to pass data and control transactions between the functional circuits.

A diagnostic bus-master circuit 66 is provided for performing diagnostic operations using bus transactions. These bus transactions may be to apply data or control values to functional circuits or recover data from functional circuits. The diagnostic bus-master circuit 66 is connected to the functional bus 64 via an optional authentication circuit 68. The diagnostic bus-master circuit 66 is also connected to a dedicated diagnostic bus 70 (e.g. a private AMBA bus or custom private bus) which provides dedicated diagnostic access to, in this example, the processor core 54 and the coprocessor 56. This dedicated diagnostic bus 70 can provide access to data values not normally coupled to the functional bus 64 and exposed on the dedicated diagnostic bus 70 purely for diagnostic purposes.

An interface circuit 72 and a diagnostic circuit 74 are provided to couple the diagnostic bus-master circuit 66 to an external diagnostic device (not shown). The interface circuit 72 supports the external protocol used by the external diagnostic device, for example, the above described bi-directional serial communication. The diagnostic bus-master circuit 66 is responsible for supporting the bus signal protocols of the respective busses on which transactions are to be issued for diagnostic purposes.

The optional authentication circuit 68 serves the function of only allowing the diagnostic bus-master circuit 66 to access the functional bus or parts of the bus 64 when an authentication step has been passed. This authentication step may be the supply of an appropriate key matching a predetermined secret key from the diagnostic bus-master circuit 66 to the authentication circuit 68. Thus, only appropriately authorised persons in possession of the secret key will be able to activate the diagnostic bus-master circuit 66 in a way that it can access the functional bus 64 through the authentication circuit 68. Accordingly, secret data or other sensitive material can be protected within the functional circuits. The authentication can be used to control some bus accesses, such as access to privileged slaves, with other bus accesses being freely available.

It will be appreciated that the integrated circuit 52 and the external diagnostic device may be operating in different clock domains. The interface circuit 72 effectively provides a means of bridging between these two clock domains.

The diagnostic bus-master circuit 66 may be used to issue bus transactions serving to load data values to a device, such as a memory, peripheral or other device, store data values back from those devices, copy data values between or verify data stored in those devices.

The diagnostic bus-master circuit 66 may also be used to program the flash memory 58 in accordance with a flash memory programming protocol. This is a non-diagnostic use of the diagnostic bus-master circuit 66 which amortises the overhead associated with its provision since some mechanism is required to be provided to program the flash memory 58 within the integrated circuit 52.

A detailed description of an example preferred embodiment follows:

Terms and Abbreviations

The following description uses terms and abbreviations as specified:

| Term | Meaning |
| --- | --- |
| JTAG | IEEE Joint Test Access Group specification for 4-6-wire interface to control a serial interface to scan chains. JTAG is used for debug as well as test. SWJ is based on the underlying debug JTAG model. ScanTAP is based on the test part of JTAG. |
| Emulator | A misnomer, used to refer to a run control box (piece of HW) attached to chip for debug. Normal emulators are JTAG based. A box connected to a SWJ interface would also be called an emulator for historical reasons. |
| AMBA | The ARM Bus standard within a chip. |
| AHB | The AMBA high-speed interface for normal memory access (vs. APB). |
| APB | The AMBA Peripheral interface for low speed access. |
| AHB Lite | Refers to a stripped down version of AMBA AHB without multi-master and without full burst mode and its associated signalling. |
| Multi-Master | An AMBA Bus sharing scheme (not in AMBA Lite) where different masters can gain a bus lock (grant) to access the bus in an interleaved fashion. |
| Multi-Segment, Multi-Layered | An AMBA scheme to break a bus into segments, which are controlled in access. This allows local masters to reduce lock overhead. |
| Arbiter, Arbitration | A bus model to replace Multi-masters. An arbiter chooses among contending masters to streamline access to a bus. Used more commonly in MCUs and asymmetrical multiple processor core layouts. It can provide better performance than a bus granting model when configured properly. |
| Flash | A form of read-only memory, which can be written using a special programming method. This allows MCUs to have the code and literals burned into the device post fabrication. For low end MCUs, this would only be done in production, not by the application (so could be done by an external tool during update/maintenance). |
| Embedded Flash | Flash cells in the same chip as the processor. As opposed to external chips. Note that Flash devices have an embedded controller (MCU) which makes embedded Flash quite expensive in die size. |

Introduction

DBT (Debug Bus Tap) is a small JTAG TAP, which connects to an AMBA bus. DBT may be accessed from a host using TJAG, SWJ, direct port, or other means and may operate on buses other than the AMBA bus. Depending on the system design, the bus connection may be a bus-mastering block for a multi-master bus design or may be an AMBA Lite block if managed by an arbiter.

The Memory TAP allows access to the memory system (beyond the L1 cache) whether the ARM core is running, stopped in debug, or held in reset. This allows the TAP to be used more broadly in the system for multiple purposes:

Bring up and test a system before the core boots. This is particularly important in all Flash systems, but also has implications for chip level testing.

Much faster download and read of memory than is possible using the processor JTAG model.

Read/Write access to memory and peripherals registers in a running system without stopping the core. This has intrusion, but it is fixed and small (since access to memory is not constant, but bounded by JTAG TCK timings).

Can access memory regardless of change of core clock speed (low speed sleep).

Can be used to program Flash when visible to bus (however some FPGA boot flashes may not be reachable if not AMBA slaves).

Configuration/Control of any debug registers not part of the core. This avoids the need for multiple TAPs to support different debug blocks. Note that debug registers can be exported by the core to avoid the need for internal mechanisms—this allows access while running and allows a cleaner design.

The Memory TAP is highly optimised to allow very fast accesses, both sequential (such as download) and non-sequential. It is also optimised for repeated polling of a single location, and can provide accurate time stamping on that polling with an emulator that supports time measurement (since the bus action is deterministic). Fast flash downloads are also facilitated by embedding small portions of the flash programming algorithm in the bus wrapper.

Debug System Bus Tap Component

The Memory TAP is aimed at addressing 7 basic issues:

1. Allows for very fast memory downloads (and uploads). At 10 MHz, downloads of 3 Mbytes/second are reasonable for faster emulators, and 600 Kbytes/second for slower ones.

2. Allows for access to memory while the ARM core is stopped (in debug), running, sleeping, held in reset, or any other state. This means that this component allows a more system view.

3. Allows for cleaner handling of faults in reads and writes on the bus. This mechanism handles aborts cleanly and does not change Processor State as a result. When memory accesses are done through the processor core, its state is impacted by all actions, but even more so by faults. The DBT does not change its state after a bus fault, other than to signal it as specified.

4. Allows programming of Flash directly (not using the core). This not only allows programming of Flash at its maximum rate (so paced by Flash itself), but also allows programming of Flash while the processor is still in reset (so can be used to program critical boot code). If FPGA bit boot flash or other device used flash is visible on the bus, it can be used to program those elements as well. Even without the optional Flash support, DBT can be used for direct Flash programming as long as the emulator can generate predictable time delays between accesses (for Flash devices that time-out), or written in a per word batch fashion with pushed-verify.

5. Can be used to access a local segment set aside for debug only. That is, the DBT can be fitted to a private bus for debug use (and may also be fitted to the system bus for global use). It can also be used to export ASIC specific debug registers both for debug components and general components so, a CAN bus peripheral could export some registers onto this segment to facilitate debug).

6. Can be used as a communication path with target SW (such as monitors and RTOS agents). Unlike 5, this can be done on the main bus as well. So, an RTOS Debug Agent can use this for access (even for RTOSes running on a DSP for example). Unlike DCC (ARM Debug Communication Channel register), this allows buffering. With an interrupt drive and some agreed upon memory locations, the host and target SW would communicate with each other using a simple handshake. The message sizes can be as long as needed, and the target SW will not be held off (waiting on CP14 for example) since it just writes to RAM and then goes on with other activities.

7. Can be used to offload trace data at high rates. On-chip trace buffers mapped onto AHB, can be offloaded at very high rates using this method. Further, with a trace buffer that can be drained while also being filled, one can get continuous collection (at some bandwidth limit such as 3-4 Mbytes/second).

Agent/Monitor Communication (Attention and ACK)

It is envisioned that DBT will be useful for direct memory access (no monitor) for download and access while the processor core is running, as well as communicating with an agent on the target while running. Agent communication works by writing a packet to RAM, signalling its completion with the Attention bit, and then waiting for the ACK signal/bit to be asserted. Then, it can read it back. The advantage of this model is that you only pay for an interrupt every packet (and even then, you can poll, but per packet—the buffering is for free). The size of packet is not fixed, but determined by the protocol and choices of the Agent or monitor.

The choice of connecting the Attention signal to the core (as an interrupt) and the choice of connecting the ACK signal back from the core (as a GPIO) is up to the system design. It is likely that this will be strongly encouraged for certain classes of processors and application uses.

The main agents to communicate with would be a monitor for straight debug as well as a thread for RTOS debug (Running System Debug (RSD) mode).

Flash Memory Support

The optional Flash memory support is provided to allow fast programming of embedded Flash within the system. The mechanism works by adding masked ROM constants for the pre-write address/data and possibly post-write address/data. It can also provide verification on the fly when needed (however, it is generally preferred to write the whole block and then go back and verify—this is fast and safer). With pushed verify, the verification step is very quick.

The Flash model would also allow in field flash re-programming from an external mechanism (such as Garage mechanic updating the programming constants for an engine control). This can be useful for applications that never change the Flash themselves.

The general reason for having Flash support in the DBT is that it allows for very fast Flash programming, whether small or large. This speeds up debugging time. Note that for many Flash devices, the time between pre-write and data write must be within a certain period, or it will time-out. This means that direct programming through a JTAG emulator is not possible. With DBT Flash support, this is not a problem.

Cache Issues and TCM

DBT can only see onto the bus. Although it has provisions for a secondary segment model, it cannot see into an L1 cache. It will only see an L2 cache if the DBT is placed in front of it (so a system design choice). Tightly Coupled Memory (TCM) also presents problems.

For an L1 cache, the issue only occurs under certain circumstances:

When downloading code, the "I" cache must be cleared/invalidated so reloads with the new data. For download, this will not normally be a problem (since core is stopped and emulator/run-control will handle cache clearing).

When downloading data, the "D" cache must be flushed (if write-back) in advance, or invalidated before or after if write through (or not modified by the core). For download, this will not normally be a problem (as outlined above).

When polling a location while the target is running, the location can be seen if not a write-back cache line (so, the location can be in a non-cached or a write-through cache area). If write-back is used, the location will not update until the next cache flush (from application behaviour or run-control support). So, it is still possible to poll with write-back, but there will be a delay of non-deterministic period (based on how long before the cache is flushed due to non-usage by the application).

When modifying a location while the target is running, the location will not affect the application if it is cached. The change will not be picked up until the cache is cleared (if write-back and the cache is changed, the DBT modification may be lost).

For a TCM, the memory will not be visible at all to DBT unless it is dual ported in some form. For example, if the TCM is also an AMBA slave or if it contains an external DMA port, which is wrapped as an AHB slave, then the DBT can access the TCM. The alternative is to support via a system model, which provides access in one of 3 ways:

1. The TCM wrapper contains an external port (DMA port for example) which is then made available to the DBT. This can be done either by making visible on the AMBA bus or by using the alternate memory concept within DBT.
2. The TCM is muxed to the DBT along with the ARM. This would have no arbitration and so could only be used when the ARM core is stopped. It may be necessary to register that interface to avoid path problems. This model provides the access at low cost, but the memory will not be accessible when the processor is running.
3. The TCM is muxed to the DBT with some form of arbitration (wait state the core if the DBT happens to be accessing it). This is the same as 2 above except that it would allow access while the core is running. It is not clear if the expense of this model would be justified for DBT use.

Without DBT support, the TCM can only be accessed by stopping the core and accessing through its JTAG mechanism (or other means, such as monitor).

MMU/MPU and Virtual Addresses

The DBT component only sees physical addresses (bus addresses). The debugger is responsible for doing any needed mapping between virtual and physical addresses. For applications that use the MMU/MPU for protection and cache control, this is not an issue (for any address X in the core, it is also address X on the bus). For applications that do use the MMU to create situations where the virtual addresses do not match the physical ones, there are 4 situations:

1) Dynamic re-mapping of locations (meaning that the mappings change while running). The virtual locations map to different physical locations for "processes". This is used by process model OSes as a way to avoid contact between processes (a.k.a. tasks). In this case, the debugger can usually find this from the OS itself or from the page tables. But, the mappings can change over time, so there is risk in accessing these locations while the core is allowed to run.
2) Static/one-time mapping (meaning that the mappings are set up at boot time and left that way). The virtual location maps peripherals or other bus objects to a "common" place. This can only be determined by page table examination. This is not very common, but the debugger would have to support by reading these tables. Depending on which ARM core, it may be possible to determine where the page tables are while the core is running (reading CP15 by scan chain). If the page tables are visible on the bus (see discussions on TCMs), then the DBT can allow the debugger to read the page tables to determine the mappings. It is also possible that the object file will contain information on this mapping.
3) Page faulting areas are created. These are used for various purposes, including copy on read, sparse matrices/arrays, mapped files (or equivalent), demand load of code from Flash, etc. These schemes all vary in what is wanted and needed. The debugger needs to understand the context of the memory handle to know what is the appropriate behaviour (causing a page fault from the debugger is often not appropriate). In some cases, the debugger knows where the data comes from (such as Flash) and so DBT can be used to access the data directly. In general, this kind of memory can only be handled when the core is stopped.

4) To create a wider address. Although the most common use of this approach (whether ASIDs, Domains, or other extension model) does not require the virtual and physical locations to be different, this mechanism, may be used to create swap-in blocks and the like. Again, the debugger needs to know the rules to be able to map these.

It is notable that only case 2 would not be an issue for core based access models (JTAG or monitors). The rest of the issues exist and must be addressed by the debugger no matter what access method is used.

It is further worth noting that at the moment, most designs use re-mapping (chip enables and chip selectors and the like) at the system level. As new ARM cores support MMU features more directly, it is possible that more designs will rely on the core for this effect. So, it is likely that debuggers will have to address these issues and the cores will need to make access to the information possible without stopping.

Access

The DBT is accessed using a set of IR|DR transactions in JTAG or equivalent.

The IR is used to select among different overall uses:

Miscellaneous JTAG: BYPASS (0xF), IDCODE (0x0A), JTAG required actions (may be ignored for those)

Local Memory access when TAP is on a local segment (0x01)

Global Memory access for normal bus visibility, regardless of bus connection type used (0x02)

Scans for access to older scan model in ARM core (0x3 and 0x4). This is reserved for Argon and V6 class cores. It could be used as a wrapper on ARM7/9/10/11 cores to provide an Argon-like model. It could also be used to wrap common accesses on older cores to make SWJ much faster. It is also possible to use this for boundary scan testing (not debug related).

All memory operations are accessed using one IR (global or local), so all operations are DR based. The model is to divide up the DR into 4 kinds of requests: control, address, read, and write. The total DR is always 34 bits.

The DR operations work such that they can be read and written at once. The CaptureDR sampled data is usually the results from the previous operation. The data written with the UpdateDR will manipulate one of the 4 request types.

Modularity

The DBT component is divided into parts, most of which are optional. FIG. 1 demonstrates this concept. Only the command block is actually required. The optional blocks are determined by how used:

The TAP is not needed if accessed using another means. For example, when coupled with SWJ, none of the TAP is needed since the SWJ component will direct drive DBT.

The scan chain TAP registers are only needed when wrapping existing ARM EmbeddedICE logic (proposed model for implementing debug monitor in pre-Argon cores) or test scan chains.

The various bus fittings are only used as needed. The multi-master (full AMBA) one is used in a multi-master system. The simple AMBA Lite one is used in an MCU with an Arbiter. An AMBA Lite one plus a simple Arbiter can be used in an MCU without an Arbiter (simple bus signal muxing with wait state drive to arbitrate/hold ARM accesses).

Extra features may be included or not. This includes: Flash programming, Attention signal out, ACK signal in, wide bus access, alternate bus access (local vs. system), etc. The host can tell what facilities are present directly from the interface (through the IDCODE, the control register, and other optional side registers). Some features are detected by enabling them and seeing if they read back as enabled; others are marked in the IDCODE part number.

It is important to note that great care has gone into avoiding too much modularity. That is, there is a cost to modularity related to complexity (too many possible combinations) and overhead (plugging together different pieces). The general approach is that modularity breaks down in DBT into 5 types:

Natural blocks. The DBT is broken into 3 levels of blocks as shown in FIG. 1. So, removal of the top block (TAP) for SWJ, or choice of which bus wrapper is a natural fit.

Based on which core and which bus. For example, having 64-bit support is only possible with a core/bus that supports 64 bit data.

Based on system specific details such as Flash. The optional flash block would only be included if there is flash on the system and it is compatible with the model.

Based on routing choices. If the Attention or ACK signals cannot be routed, they have to be left off. These kinds are strongly encouraged for compatibility. But, some may not make sense. For example, a local debug segment is only appropriate for certain designs.

Due to system extensions/concerns such as security and JTAG test scan chains. These extensions allow the DBT to serve a wider purpose.

IDCODE JTAG Scan

The IDCODE contains the ARM manufacturer ID code, a special part number for the DBT, and revision information.

The part number is divided into a unique prefix for DBT (probably 3xx) with the "xx" part as base configuration information. The configuration information allows quick analysis of the DBT's overall capabilities (Local vs. Global memory access, Flash support, Test scan chain support, security, etc).

Memory Accessing Command Interface

DR is 34 bits. Bits are packed such that the last 2 bits are type when in via TDI (host to target) and status when out via TDO. So, TDI->32-bit data->2-bit control/status->TDO.

The send format is:

[Type as 1:0] [Value as 31:0]

The reply format is:

[Status as 1:0][Return data as 31:0]

Note that the reply is skewed by one transaction (so, the reply from a type/value sent via UpdateDR will be replied in the next CaptureDR). Further note that doing a CaptureDR->UpdateDR without a shift is a special case in write mode—it allows a fill (when auto-increment) or re-write (when not auto-increment).

Type is one of:

| | |
|---|---|
| 0 | Control. Value is control bits which can be changed or not (see commit flag). |
| 1 | Address. Value is address. |
| 2 | Data Write. Value is data to write. If writing less than 32 bits, the data is little endian (LSB contains data). |
| 3 | Data Read. Value is ignored for memory read. |

Status is composed of two bits as:

Bit0 (LSB) is nCOMPLETE

Bit1 (MSB) is ERROR

The Status combinations are read as (Bit1, Bit0):

| | |
|---|---|
| 0,0 | Transaction completed OK (So Return data is requested data). |
| 0,1 | Transaction has not completed. This is not possible for Address or Control. |
| 1,0 | Transaction completed with Error. Return data contains error information. |
| 1,1 | Reserved. |

Control Request

[00][Control Word]

Where control word is composed of bits from LSB to MSB:

Bit 0: Auto-increment address on Read or Write data. Only increments if current transaction completes. This means that it will not increment if failed on error or new request comes in too soon (before complete). Note: increments only bottom 12 bits. So, increments within a 2^12 page.

Bits 1-3: size of operation as:

0=8 bits

1=16 bits

2=32 bits

3=64 bits (when data bus accommodates only)

N=4-7 reserved.

Bits 4-7: Flash control as:

0=No flash—normal AHB operations.

1=Flash write enable. This means that all writes will send out Flash control operations before/after the value as needed. This bit will not stay set if Flash support is not available.

2=No Flash, Pushed Verify. This means that all subsequent writes will not perform an actual write, but will read the current location on the bus and compare the results with the value passed. If the compare matches, the 'write' is treated as successful. If the compare fails, the status will indicate an error.

3=Flash write with read-back enabled. This means that after the write, the data is read back to confirm set properly. Note rules for flash writing to be sure operation completed.

4=4-15 reserved.

Bits 8-11: Reserved for operation override. This will later allow for accessing "alternate" memories and busses. 0 is for normal bus operations.

Bit 12: Attention signal. When available, this will cause an interrupt to be sent to the ARM core. This allows mailbox-type signalling (see also ACK). This is a self-clearing signal. So, writing an Assert, will signal the ARM and then clear. Note that the Attention/ACK extension mode can be used to change which signal(s) are driven (when the system provides multiple Attention signals).

Bit 13: ACK return signal. When available, this allows the ARM core to signal that it has replied or accepted a mailbox operation (packet sent). This is a self-clearing latch. So, it will read asserted only once, and then will read de-asserted until the next Assert. Note that the Attention/ACK extension mode can be used to change which signal(s) are sampled (when the system provides multiple ACK signals).

Bit 30: Sticky-Status. If an error or not complete occurs, subsequent requests will be ignored until Control is read again. That is, if a data read/write request is made and it either fails or any other request is made while it is still waiting on the bus, that request and all future ones will be ignored until a control request is pushed in. This insures that the host can tell what has happened. Note that when this bit is set, the status returned on all ignored commands will also indicate failure. When set the system does not commit the clear.

Bit 31: Commit control changes. This flag must be set for the control word to be written to the control set. If not set, the control word is ignored (this allows reading it only (including clearing the Sticky-status), and makes for a simple NOP).

The reply (next scan's results) will be the control set that is currently latched. This can be used to check Sticky-Status (whether commit or not) and can be used to determine if an operation is allowed: For example, if size is set to 64 (size is 3), but reads back as 32 (2), then 64 bit operations are not supported by this TAP. Similarly for Flash operations and operation overrides.

Address

[01b][Address]

Where address is a bus address (physical) when operation override is for normal bus operations (see Control for details).

The Address written is saved for future data read and write operations. Note that auto-increment mode means that this address will increment (by the data size) on all successful data read/write operations that follow.

The reply (next scan's results) will be the same as the address that is written in this request.

DataWrite

[10b][Value to Write]

This operation will write the 8, 16, 32, or 1 $^{st}$/2$^{nd}$ half of a 64-bit value from Value passed in to the current address in the saved address set (see the Address request). The address will then increment by 1, 2, 4, or 8 (within the number of bits it can increment) if successful.

The reply (next scan's results) will indicate if the write failed on error or was successful.

DataRead

[11b][Ignored Value]

Where the outbound value is ignored when operation override is set for normal bus operations (it may be used for scan operations to name the register for the scan chain specified by address).

This operation will read the 8, 16, 32, or $1^{st}/2^{nd}$ half of a 64-bit value from the current address in the saved address set (see the Address request). The address will then increment by 1, 2, 4, or 8 (within the number of bits it can increment) if successful.

The reply (next scan's results) will be the value read if status is OK, else error info if an error. (Note: It is the job of the AMBA controller to return on the ReadDATA bus the error codes, if the error bit is set.)

EXAMPLES

These examples are shown to illustrate how this interface is intended to be used. Note that it would be more practical for most emulators to build up the scans into a buffer and then run them all at once. This extends to multiple single operations and downloads. The return data can be inspected at the end to determine if all succeeded or not.

Writing a Single Value

The following shows how a single value would be written. Note that the write to Control and Address are not needed if they already contain the correct values.

```
ScanOut(Control, SIZE(2)|COMMIT)   -- set size to 32 bits
ScanOut(Address, addr)             -- set address to write
ScanOut(DataWrite, value)          -- set value to write
ScanIO(Control, 0, &results)       -- get results to be sure worked
If(!results[status])
    Succeeded
Else
    Failed
```

Reading a Single Value

The following shows how a single value would be read. Note that the read from Control and Address are not needed if they already contain the correct values.

```
ScanOut(Control, SIZE(2)|COMMIT)   -- set size to 32 bits
ScanOut(Address, addr)             -- set address to read
ScanOut(DataRead, 0)               -- set value to read
ScanIO(Control, 0, &results)       -- get results
If(!results[status])
    Data_read = results[value]
Else
    Failed
```

Writing Multiple Values (Downloading)

The following shows how multiple values would be written. Note that the write to Control and Address are not needed if they already contain the correct values. Note that this algorithm handles the case of wrapping over the 4K limit (byte address limit). That is, the auto-increment feature only acts on the bottom 12 bits. So, when the address passes 4K aligned points, it must be rewritten. Since we do not know if the address coming in is aligned on a 4K boundary, we simply write it when it changes to the next boundary. Also note the check for collective errors at the end of each block using the sticky bit. If an error is detected, the loop could be retried using a slower scan (more spins in RunTestIdle for example).

```
ScanOut(Control, AUTO_INC|SIZE(2)|COMMIT) - size=32, incrementing
ScanOut(Address, addr)                    -- set start address to write
for(index = 0; index < length; index++)
{
    ScanOut(DataWrite, value[index])      -- set next value to write
    addr += 4;
    if(!(addr & 0xFFF))                   -- Note: addr inc is 12 bits only
    {                                     -- wrapped to next page
        ScanOut(Control, 0)               -- get results to be sure worked
        ScanIO(Address, addr, &results)   -- set next aligned address
        if(results[data] & STICKY_STATUS) -- results from control request
            Failed                        -- collective failure
    }
}
```

Writing Multiple Values to Flash

Writing to flash is essentially the same as a normal memory operation, except for the following points.

When Bit 4 (flash programming) is set, flash programming commands are also issued to the bus interface along with the data. Since programming flash takes much longer than SRAM, once the command has been accepted by the RTI delay (between UpdateDR and CaptureDR), the next word programmed may be queued to save time, followed by tuned delays in PauseDR. That is, a write is followed by another write and then enough spins in PauseDR to insure the Flash write (and optional read-back) completes. Then, the state is advanced through UpdateDR normally, which will start that write. Again, more can be queued. After a block of these, the caller should check the sticky status to see if operations have completed successfully.

Miscellaneous Results
Integrator/AP with RVI-ME (4-8 MHz TCK)
Download 500 kB/sec (RAM)
Flash program 180 kB/sec (2 chips at ×16 each to form 32-bits)
Memory fill 3700 kB/sec Design Approach The DBT was built around a model as outlined above, e.g. in Problem and Solution. To provide more details, this section explains why different parts were constructed as they were.

Overall Design

The overall design of the DBT is to provide a mechanism to allow very fast and easy access to the memory/peripheral system of the chip. This means that the size or IR and DR scan chains and style of use all were designed to optimise performance for the typical uses made by debuggers and test tools: download, fill, sampling a location, hot patch in a running system, communications with a monitor or agent, Flash programming, memory verify.

The DBT was not designed to cover other kinds of uses for debug directly. That is, it is a simple AHB/AHB-Lite memory access component. Other kinds of debug can be facilitated using DBT if they expose themselves using a bus model, whether on the system bus or a private debug bus (segment). This focused use model is intended to allow DBT to be used in a wide range of devices. Further, this means that as other memory accessible components are added, they can be accessed via traditional JTAG when DBT is not available or using DBT. This helps to insure cleanest inter-operability. Example devices that would be "coupled" using a bus model (system or local) are: ETM (Trace), ETB (Trace buffer), a Debug monitor, ASICs in an SOC (information gathering), CTI/CTM (Cross Triggering), and FPB (Flash Patch and Breakpoint).

Note that the DBT design is based on the idea that JTAG emulators tend to be better at sending data than getting data (Note that SWJ (Single Wire JTAG) is an extreme example of this, regardless of the emulator in use). This is both because of communication models and because of intelligence needed to post process results. Verification and collective error is an excellent example of this. That is not to say that a very powerful emulator (such as ARM RVI) could not choose to use bi-directional means and local analysis, but even those emulators will benefit from closely coupled decisions because it reduces the number of TCKs needed to perform most operations.

Bus Interface

The Bus interface model was designed to be modular to accommodate different system designs. It would be unreasonable to expect a micro-controller to use a fill AHB multi-master model when AHB-Lite is what is wanted. Similarly, it would be unreasonable to assume a single segment and expect the system designer to build a mastering bridge.

The local vs. global model (allowing two kinds of bus fittings at once) was designed in to accommodate system designs that need to have explicitly different access models. The main need for this is debug monitor local memory vs. system memory. By defining debug monitor memory as a special segment (which may include debug memory mapped registers as well), bus mastering and/or arbitration is not needed when making local access; this allows the full system to run with less intrusion during debug operations. Further, the local bus model insures that other components on the bus do not corrupt or contaminate the data. Finally, the local segment allows for secure information control without the option of snooping.

Flash

The Flash model was based on the notion that most Flash parts can be programmed using a set of writes before the value, the value, and optionally some writes after. To get best speed, many Flash devices allow status checks to determine when done. The DBT model does not do this normally. Instead, it operates by having the JTAG interface use up enough time to accommodate normal Flash writing. A post write verify will detect if any cells did not get written properly. This approach is not appropriate for applications to use, but provides a safe method with best speed (and gate cost) for a hosted model. The worst case scenario is simply that the Flash has to be re-written if overrun.

For cases where the Flash must be verified immediately, the optional Write flash with verify method can be used. This allows the JTAG emulator to check for failure immediately after writing a byte or word, while still taking advantage of batching a multi-word write into a block transfer.

Pushed Verification

The verification model is based on a non-intuitive "push" model. This means that a write is sent down, but is not performed as a write. Instead, the location is read (from the bus) and compared against the pushed value. The results then come back in 2 bits (error/status) and work with collective error models as well. This was done because it favours a sending model. The alternative is to send in a read and send back the results to be compared on the host. By doing block writes followed by pushed compares followed by more operations, the host can batch up the largest number of operations to get the best overall performance. If the verifies fail, the remaining operations are ignored, which is appropriate (for error handling). This avoids roundtrips between host and target.

Pushed verification can be used for Flash verify, SRAM download verify, general write verify, and for value change sampling. The latter means that the host can be watching a location (or set of locations) for change and then get an approximate timestamp for when it changed. The expected value is pushed down and then the operation is cycled over and over. By looking at the status bits (2) every so often, the host can then determine when a value changed (verify returns an error when different from what was pushed).

Attention and ACK

The Attention and ACK model are clear to anyone used to a mailbox model. It avoids polling by the target and avoids bus polling by the DBT device (which is intrusive). The Attention and ACK extension model allows for DBT components that choose to have multiple Attention and/or ACK signals (such as to different cores), but does not slow down the simple case. That is, the extension model allows using a separate control request to select which Attention signals to drive (one or more) and which ACK signals to sample (one or more) and then the normal model of driving the current settings using Control can be used. This means that Attention and ACK can be used in a faster inline mode, with only extra scans needed when changing the selected sets.

Figure 6:
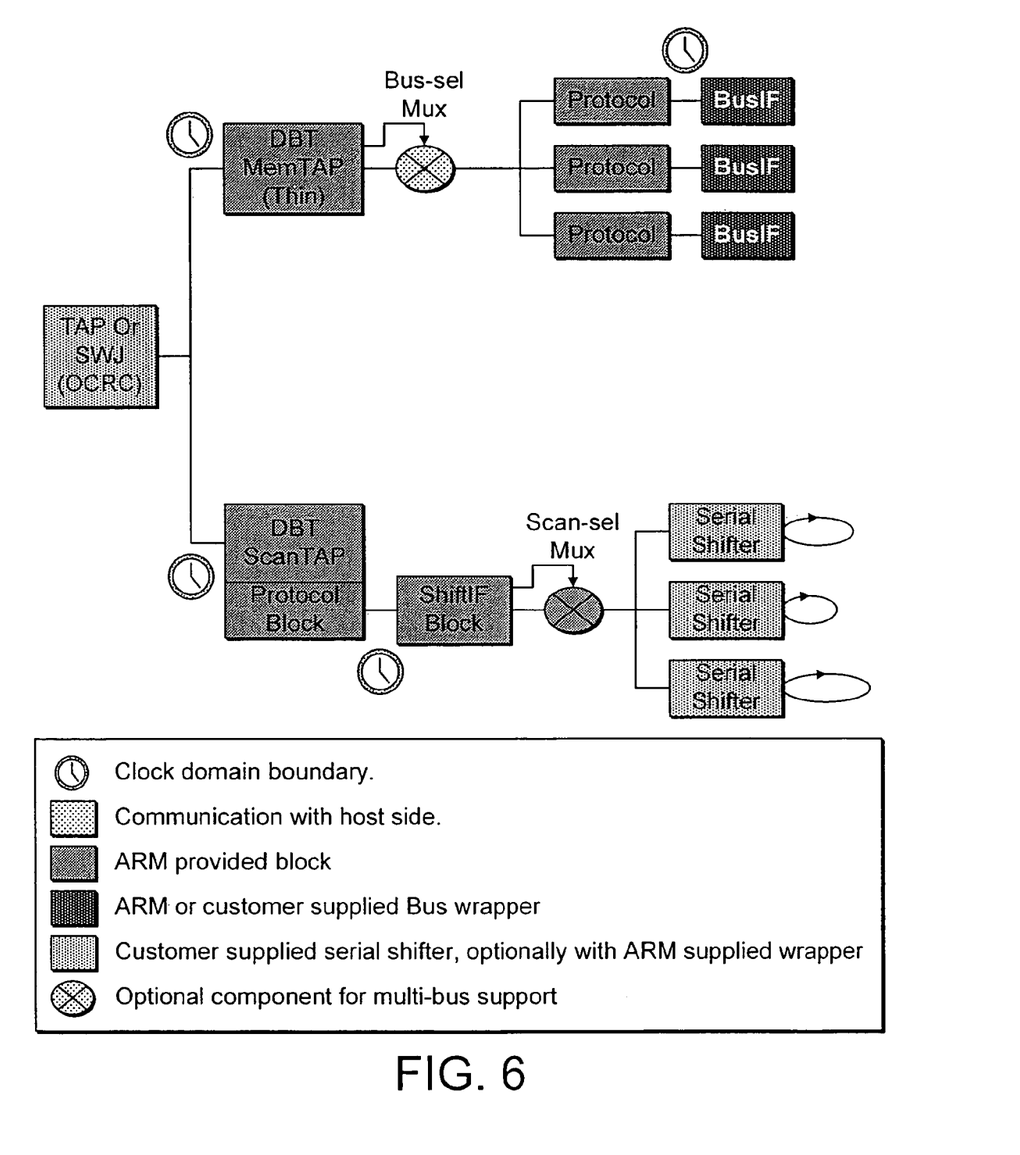
FIGS. 6 and 7 schematically illustrate the form of a diagnostic bus master and boundary chain control.

FIG. 6 shows the relationship of ScanTAP to MemTAP (a way of supporting scanning in a manner closer to memory accesses) and how both fit into DBT as well as showing an implementation/architectural model. The model proposed for ScanTAP is designed to accomplish 4 tasks:

Clean separation at clock domain boundaries. This provides the smallest possible registered interfaces and manages handshakes between clock domains, especially to handle propagation overhead in scanning.

Simple MUX model to allow multiple scan chain handlers.

Easy implementation for scan chain handlers—they can be wrapped with simple Verilog to support ScanTAP interface if they do not want to use that interface themselves (Bridge support and clocking).

Optimised for insert/extract use with large scan chains.

Figure 7:
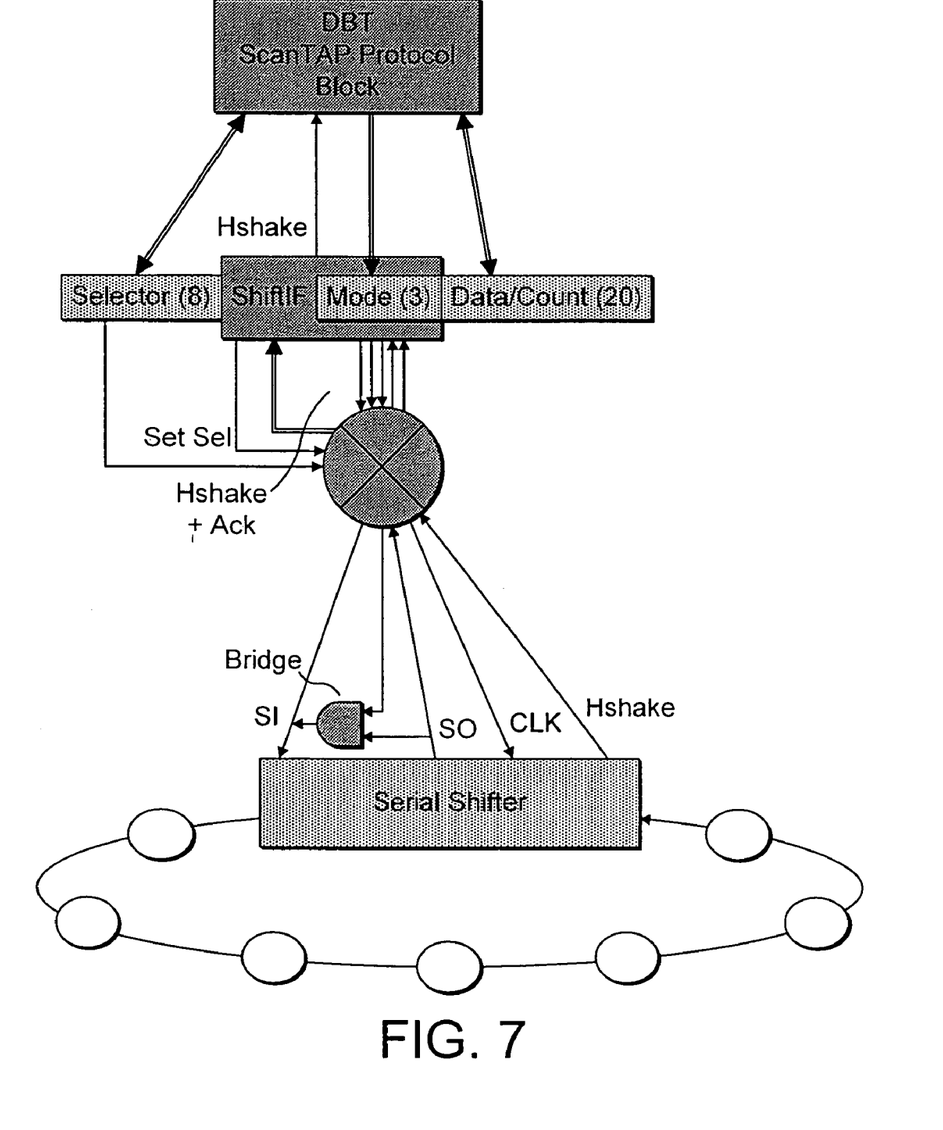

The ScanTAP scheme creates 4 distinct blocks, only one of which the system designer has to implement (and probably already has). These blocks are shown in FIG. 7.

1. The protocol block. This block uses the same basic protocol as the MemTAP sub-component. It can be accessed via the TAP block (for straight JTAG) or the On-Chip Run-Control block for SWJ. It manages a simple 34-bit register model, which provides access to 4 32 bit registers. The 4 registers match the 4 registers of MemTAP, but are used for slightly different uses:

Control: selector (for scan chain), request, and data counter. Returns status (if operation is complete). Request indicates: pre only, post only, insert data only, extract data only, pre then insert data then post, and pre then extract data then post.

Address: pre and post counters (16 bits each). When enabled by control, these skip scan cells to get to the ones wanted for insert and extract.

Extra: unused. May be used to read back current scan chain size.

Data: insert and extract data values. These are used for setting/getting the data in the current position of the scan chain. It supports operations of 1-32 bits per use. Repeated access of this register will perform the current requested operation each time for the size given in control. So, 4 operations of 32 bits each could be used to process 128 bits of scan. Since there is only 2 bits of overhead, this means that the cost of using this mechanism is low.

2. The ShiftIF block. This block is on the other side of a clock domain boundary. This allows the scan cells to operate at a much higher clock rate than the requests into the protocol block do. This block manages modes, counts+data (a 20 bit register), and MUX selections. The same 3 registers are used for all modes. The ShiftIF mode indicates which action to take: set selector, set count and then drain (advance for pre or post), set data+count and then drain for insert, set count and then drain for extract into data register. The interface to ShiftIF uses a handshake to acknowledge completion. The selector and count+data are registered interfaces, which can be written and read when not requesting a mode (action). An insert looks like: write data+count (20 bits), then write mode, then wait for handshake. An extract looks like: write count (upper 4 bits), then write mode, then wait for handshake, then read data (16 bits).

3. The Selector MUX. The ShiftIF block requests the MUX to switch the currently selected scan. This is done when the selector register is written and then the mode is set to set-selector. The MUX uses a handshake and ACK/Error signal to indicate if accepted. An error response will clear the selector register in the ShiftIF block so that the protocol block can detect if accepted (on read back). This allows the emulation SW to determine if the scan chain exists for that particular device.

4. The serial shifter. The SoC/ASIC vendor provides the serial shifter. It can either use the 5-signal interface, or use the provided wrapper. The 5 signal interface is composed of 3 inputs: a "clock" (advance), a "bridge" request, and SI (shift-in). The 5 signal interface also contains 2 outputs: a handshake (ACK), and SO (Shift-out). The clock is pulsed on each advance request (of any form) and then the serial shifter drives the handshake signal when the shift is complete (signal has propagated through whole scan chain). The bridge signal is asserted and held before the clock when the SO signal should be gated to the SI input. This allows the scan to advance and keep the same contents (if all bits shifted around).

4. The ShiftIF block performs a pre or post skip by holding the bridge signal and pulsing count times (loaded by the protocol block). The handshake determines the rate possible. The ShiftIF block will not assert its own handshake back to the protocol block until done, so there is no overrun possible. The ShiftIF block performs a data "extract" operation by holding the bridge signal and pulsing clock count times. Each SO is shifted into the data register. The protocol block then reads data when the handshake is asserted. The ShiftIF block performs a data "insert" operation by not holding the bridge signal and pulsing clock count times. Each SI is driven using the bottom bit of the data register, which is then shifted. The protocol block will have preloaded data (and count).

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An integrated circuit comprising:
   a plurality of functional circuits for performing data processing operations;
   at least one functional bus for providing communication between said plurality of functional circuits during non-diagnostic functional operation of said integrated circuit; and
   a diagnostic bus-master circuit for performing a diagnostic operation upon at least one of said plurality of functional circuits by issuing a bus transaction request via said at least one functional bus to one or more of said plurality of functional circuits during real time operation of said plurality of functional circuits.

2. An integrated circuit as claimed in claim 1, wherein said diagnostic bus-master circuit is operable to perform at least one of:
   debugging operations;
   manufacturing test operations;
   manufacturing programming operations;
   manufacturing configuration operations;

field programming operations; and
field configuration operations.

3. An integrated circuit as claimed in claim 1, wherein said diagnostic bus-master circuit is operable to perform an authentication operation to authorise said diagnostic bus-master circuit to at least one of perform diagnostic operations and access said functional bus.

4. An integrated circuit as claimed in claim 3, comprising an authentication circuit connected to said at least one functional bus, said authentication operation comprising said diagnostic bus-master circuit issuing an authentication request to said authentication circuit, said authentication circuit being operable to selectively authorise said diagnostic bus-master circuit in dependence upon said authentication request matching predetermined criteria.

5. An integrated circuit as claimed in claim 1, comprising a dedicated diagnostic bus connecting said diagnostic bus-master circuit to at least one of said plurality of functional circuits, said dedicated diagnostic bus providing access to data not accessible via said at least one functional bus.

6. An integrated circuit as claimed in claim 1, comprising a plurality of functional buses having different bus protocols, said diagnostic bus-master circuit comprising a plurality of bus interface circuits each for communicating with a respective functional bus using a bus protocol for said respective functional bus.

7. An integrated circuit as claimed in claim 1, wherein said diagnostic bus-master circuit comprises an external interface circuit for communicating with respective external diagnostic devices using respective external signal protocols.

8. An integrated circuit as claimed in claim 1, wherein said diagnostic bus-master circuit is operable to transfer signal between a clock domain of said integrated circuit and a clock domain of an external diagnostic device coupled to said diagnostic bus-master circuit.

9. An integrated circuit as claimed in claim 1, wherein said diagnostic bus-master circuit is operable to perform at least one of:
load data values from a device coupled to said at least one functional bus;
store data values to a device coupled to said at least one functional bus;
copy data values between devices coupled said at least one functional bus; and
verify data values stored in a device coupled to said at least one functional bus.

10. An integrated circuit as claimed in claim 1, wherein a flash memory is coupled to said at least one functional bus and said diagnostic bus-master circuit is operable to program said flash memory using a flash memory programming protocol.

11. An integrated circuit as claimed in claim 1 wherein said integrated circuit is a system-on-chip integrated circuit.

12. An integrated circuit as claimed in claim 1, wherein said at least one functional bus is an external bus of said integrated circuit.

13. An integrated circuit as claimed in claim 1, wherein said at least one functional bus is an AMBA bus.

14. A method of performing real time diagnostic operations upon an integrated circuit having a plurality of functional circuits operable to perform data processing operations and at least one functional bus operable to provide communication between said plurality of functional circuits during non-diagnostic functional operation of said integrated circuit, said method comprising the step of issuing a bus transaction request from a diagnostic bus-master circuit via said at least one functional bus to one or more of said plurality of functional circuits during real time operation of said plurality of functional circuits.

15. A method as claimed in claim 14, wherein said diagnostic bus-master circuit is operable to perform at least one of:
debugging operations;
manufacturing test operations;
manufacturing programming operations;
manufacturing configuration operations;
field programming operations; and
field configuration operations.

16. A method as claimed in claim 14, wherein said diagnostic bus-master circuit is operable to perform an authentication operation to authorise said diagnostic bus-master circuit to at least one of perform diagnostic operations and access said functional bus.

17. A method as claimed in claim 16, wherein an authentication circuit is connected to said at least one functional bus, said authentication operation comprising said diagnostic bus-master circuit issuing an authentication request to said authentication circuit, said authentication circuit being operable to selectively authorise said diagnostic bus-master circuit in dependence upon said authentication request matching predetermined criteria.

18. A method as claimed in claim 14, wherein a dedicated diagnostic bus connects said diagnostic bus-master circuit to at least one of said plurality of functional circuits, said dedicated diagnostic bus providing access to data not accessible via said at least one functional bus.

19. A method as claimed in claim 14, wherein said integrated circuit comprises a plurality of functional buses having different bus protocols, said diagnostic bus-master circuit having a plurality of bus interface circuits each for communicating with a respective functional bus using a bus protocol for said respective functional bus.

20. A method as claimed in claim 14, wherein said diagnostic bus-master circuit comprises an external interface circuit for communicating with respective external diagnostic devices using respective external signal protocols.

21. A method as claimed in claim 14, wherein said diagnostic bus-master circuit is operable to transfer signal between a clock domain of said integrated circuit and a clock domain of an external diagnostic device coupled to said diagnostic bus-master circuit.

22. A method as claimed in claim 14, wherein said diagnostic bus-master circuit is operable to perform one or more of:
load data values from a device coupled to said at least one functional bus;
store data values to a device coupled to said at least one functional bus;
copy data values between devices coupled to said at least one functional bus; and
verify data values stored in a device coupled to said at least one functional bus.

23. A method as claimed in claim 14, wherein a flash memory is coupled to said at least one functional bus and said diagnostic bus-master circuit is operable to program said flash memory using a flash memory programming protocol.

24. A method as claimed in claim 14, wherein said integrated circuit is a system-on-chip integrated circuit.

25. A method as claimed in claim 14, wherein said at least one functional bus is an internal bus of said integrated circuit.

26. A method as claimed in claim 14, wherein said at least one functional bus is an AMBA bus.

* * * * *